United States Patent Office 3,442,090
Patented May 6, 1969

3,442,090
DEMETHANIZATION OF SEPARATED LIQUID THROUGH HEAT EXCHANGE WITH SEPARATED VAPOR
Nikolai Konstantinovich Baibakov, Plotnikov per. 16, kv. 16; Diomid Vasilievich Ivanjukov, Karmanitsky per. 10, kv. 4; Boris Georgievich Bergo, Ukrainsky bulvar 6, kv. 132; Viktor Semenovich Gersh, ul. Vavilova 34/4, kv. 310; Viktor Ivanovich Ivanov, pos. Krasny Stroitel, ul. Gazoprovoda 11, kv. 11; Ilya Rafailovich Cherny, Zubovsky bulvar 31/33, kv. 16; Roman Iosifovich Epstein, Varshavskoe shosse 135-a, korp. 3, kv. 129; Kirill Zyskovich Bochaver, Leningradskoe shosse 124, kv. 114; and Olga Anatolievna Alentieva, Durasovsky per. 3, kv. 17, all of Moscow, U.S.S.R.
Filed Mar. 1, 1967, Ser. No. 619,626
Int. Cl. F25j 3/02
U.S. Cl. 62—23     8 Claims

ABSTRACT OF THE DISCLOSURE

A gaseous hydrocarbon mixture is partially condensed and separated. The separated methane rich vapor phase is passed to the high pressure zone in a demethanizer where further condensation occurs. Separated liquid condensed from the hydrocarbon mixture is expanded into a low pressure zone of the demethanizer where it passes in indirect countercurrent heat exchange with the methane rich vapor in the high pressure zone causing the methane in the expanded liquid to vaporize thus demethanizing the expanded liquid in the low pressure zone through direct countercurrent heat exchange while condensing a methane rich liquid from hydrogen vapor in the high pressure zone of the demethanizer. The demethanized liquid comprised primarily of ethane and ethylene leaving the low pressure zone is vaporized through heat exchange with incoming gaseous hydrocarbon mixture. Partially condensed methane rich vapor after exiting from the high pressure zone is separated into hydrogen rich vapor and methane rich liquid fractions.

---

Figure 1:
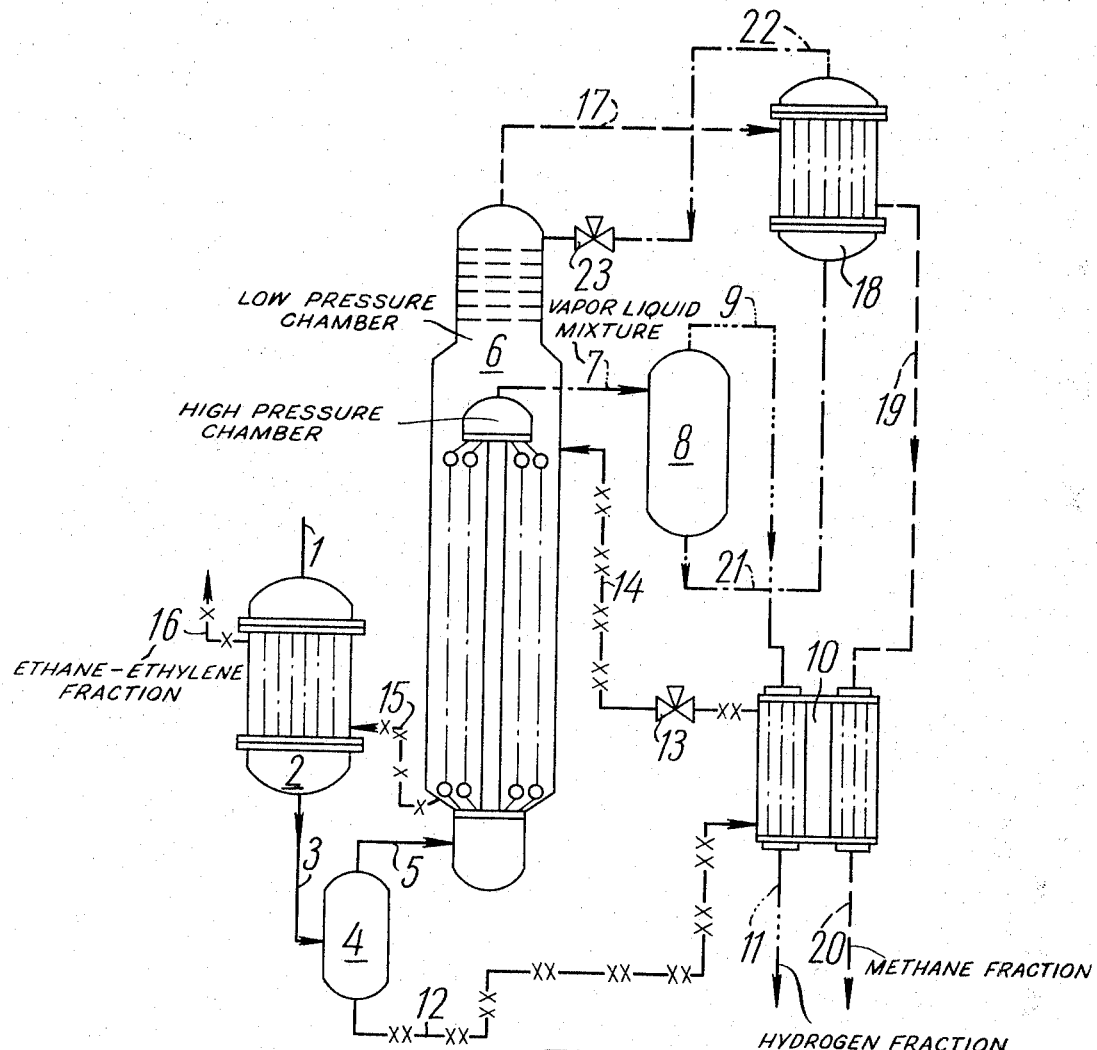

This invention relates to methods for the separation of multicomponent gaseous mixtures comprised of methane and heavy hydrocarbons, preferably dry petroleum gases and pyrolysis gases, involving condensation and evaporation in a fractionating column, which effects isolation of the low-boiling components, e.g. methane, from the mixture of thereof with higher-boiling liquefied components, e.g. ethylene, ethane, propane, and butane, and withdrawal of said low-boiling gaseous components from the fractionating column top, whilst the demethanized fraction is withdrawn from the column bottom. This process step is known as demethanization.

Among diverse prior art methods of demethanization, the most extensively used techniques are those based on the separation of gases by rectification at low temperature.

For example, in a prior art (method see BDR Pat. 1,182,257) the feed gas is compressed to a pressure of 40 ata., thereafter cooled to a temperature of minus 60° C., and the liquid-vapor mixture thus obtained is delivered into a column for fractionation under a pressure of 40 ata.

In said prior art method, refrigeration provided by a cascade cycle is employed both for cooling the feed gas and in the reflux condenser of the fractionating column (demethanizer). In the column under adiabatic conditions, there proceeds countercurrent heat transfer between vapor and liquid, and separation results in the accumulation of methane fraction vapors in the column top which are liquefied in the reflux condenser of the column, whilst the ethane-ethylene fraction collects in the column bottom, from whence it is directed for further separation. It is also known to subject the feed stock to deep cooling so that it will be delivered into the fractionating column in the liquid state.

In the reflux condenser of the column, use is made of refrigeration provided by the cascade cycle, while steam is the conventional heat-transfer agent employed for heating the still.

This and other prior art demethanization techniques suffer from the disadvantage of requiring a high energy consumption due to the employment of a cascade cycle for providing refrigeration and, hence, the product ethylene is expensive. To employ the hydrogen fraction obtained by separating the feed stock, said fraction must be additionally compressed to a presuree of 50 ata., which step necessitates extra energy consumption and also the erection of a compressor plant.

It is an object of the present invention to provide an economically efficient demethanization system requiring no external low-temperature refrigeration, to obtain saving on metal due to the employment of a condensing-evaporating column that functions simultaneously as a heat exchanger and a fractionating column, and, hence, to decrease the prime cost of obtaining ethylene from dry petroleum gases or pyrolysis gases.

This object of the present invention is accomplished by a method whereby the gaseous feed stock, comprised mainly of methane and heavy hydrocarbons, is compressed, subjected to low-temperature refrigeration until there occurs partial condensation. The liquid phase thus obtained is throttled and separated in the low-pressure chamber of a condensing-evaporating column. In the column, the liquid phase is warmed and a methane-rich vapor is withdrawn from the column top. According to the present invention, the uncondensed portion of the feed gas is introduced into a high-pressure chamber (about 60 atm.) of the condensing-evaporating column, and while it flows upwards there takes place heat transfer between said gaseous phase and the liquid phase, the resultant single-pass condensation causing the formation of a vapor-liquid mixture and the transmission of the heat of condensation to the liquid phase, an additional feature being that in the low-pressure chamber (about 3 to 4 atm.) of the column provision is made for the direct countercurrent contact between the formed methane-rich vapors and the liquid phase feed.

The process of single-pass condensation is carried out at a pressure of ca. 60 atm., thereby making it possible to obtain a hydrogen fraction compressed to 55 atm. and use said fraction without additional compression.

With a view to obtaining a high degree of ethylene removal, the vapor-liquid mixture obtained in the high-pressure chamber is separated into a gaseous hydrogen fraction which is used for supercooling the liquid phase obtained by the partial condensation of the feed gas, and a liquid methane fraction is fed as a reflux into the top part of the low-pressure chamber of the column. Where the content of methane is low, it is expedient to decrease ethylene losses with the methane fraction by withdrawing a part of the methane-rich vapors from the low-pressure chamber and feeding said part to the suction side of a feed gas compressor of a recycling compressor.

In order to recover the refrigeration of the methane fraction withdrawn from the top of the low-pressure chamber of the column, said fraction is directed into liquid supercoolers.

To cool the compressed gas until there takes place partial condensation, use is made of the refrigeration provided by the demethanized fraction, the feed gas being directed from below into the high-pressure chamber of the condenser-evaporator so that the heat of condensation of said gas goes for the evaporation of a part of the ethane-ethylene fraction with concomitant enrichment with ethylene the vapors formed.

In the low-pressure chamber of the condenser-evaporator, the vapors formed are caused to travel countercurrently to the ethane-ethylene fraction.

As compared to the known methods for the production of ethylene and propylene, the present method has the following advantages: electrical or mechanical power consumption is decreased by approximately 20%; there is no necessity for employing a high-power, low-temperature, cascade refrigerating cycle so that the equipment used is simpler and less expensive, and the consumption of cooling water is reduced by ca. 50%, the overall effect of the employment of the present method being that the prime cost of the production of 1 t. of ethylene is reduced by ca. 20%.

Figure 2:
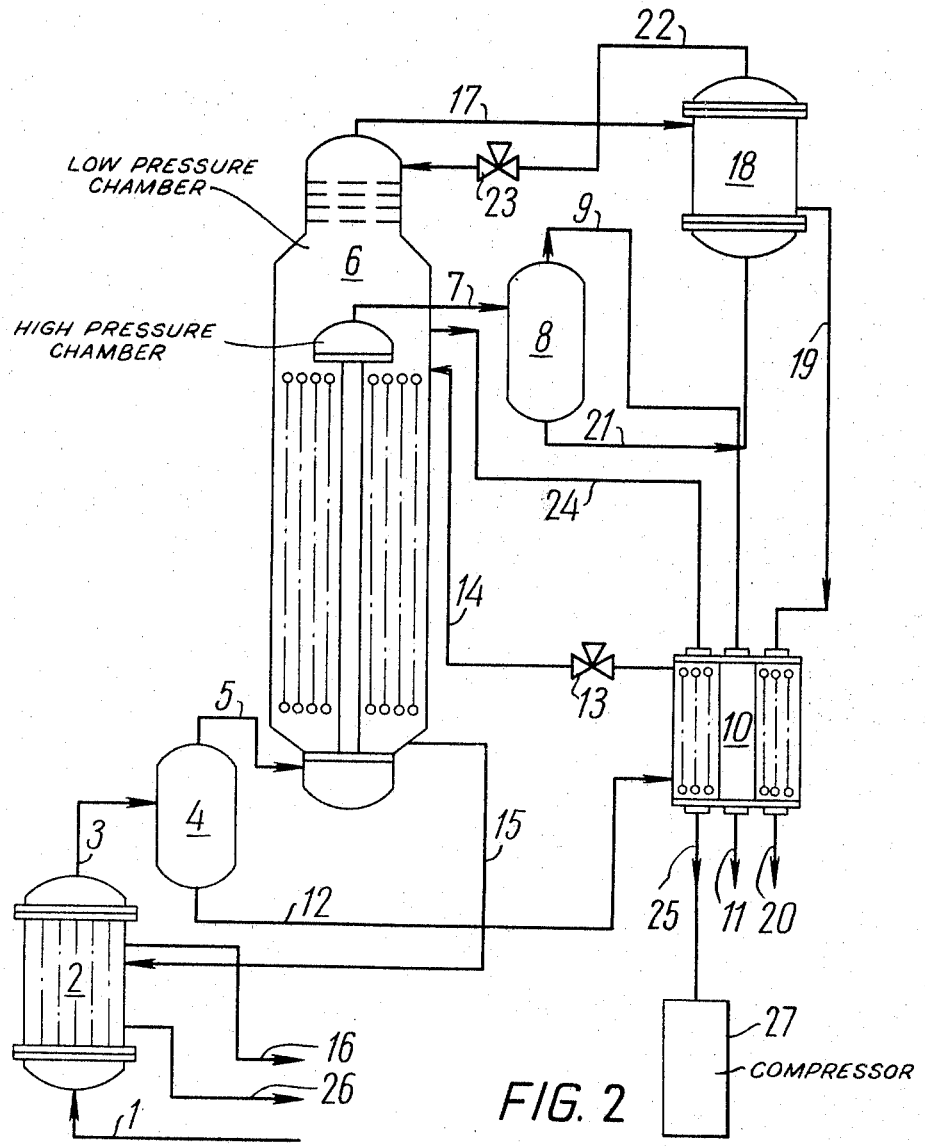

For a better understanding of the present invention by those skilled in the art, the invention is illustrated by a detailed description and appended drawings (FIGS. 1 and 2), wherein:

FIG. 1 is a flow diagram of the demethanizing assembly of an ethylene plant, and FIG. 2 is a flow diagram of the demethanizing assembly version used where the content of methane in the feed gas is low.

The feed gas consists of a mixture of dry petroleum gas and ethane pyrolysis gases and has the following analysis:

| Component: | Content, mol percentage |
|---|---|
| $H_2$ | 29 |
| $CH_4$ | 30 |
| $C_2H_4$ | 18 |
| $C_2H_6$ | 18 |
| $C_3H_8$ | 3.5 |
| $C_4H_{10}$ | 1.5 |
| | 100 |

Upon compression to 60 atm., drying, purification, and cooling, the feed gas is delivered via pipe line 1 into condenser-evaporator 2 where it is cooled with the ethane-ethylene fraction withdrawn from the bottom of the low-pressure chamber of the fractionating column.

The vapor-liquid mixture obtained in condenser-evaporator 2 at a temperature of minus 60° C. is fed via pipe line 3 into separator 4 where the liquid phase is separated from the uncondensed part of the feed gas.

The uncondensed part of the feed gas is delivered via pipe line 5 into the high-pressure chamber of fractionating column 6 wheer it undergoes cooling down to minus 120° C. The vapor-liquid mixture thus obtained is fed through pipe line 7 into a separator 8, from whence the hydrogen fraction flows via pipe line 9 into supercooler 10 and thereafter is withdrawn at a temperature of minus 70° C. and a pressure of 55 atm. from the demethanizing assembly via pipe line 11.

The hydrogen fraction has the following analysis:

| Component: | Content, mol percentage |
|---|---|
| $H_2$ | 85 |
| $CH_4$ | 14 |
| $C_2H_4$ | 1 |
| | 100 |

The liquid phase leaving separator 4 through pipe line 12 is supercooled in supercooler 10, then subjected to throttling in valve 13, from whence it is delivered via pipe line 14 into the middle of the low-pressure chamber of fractionating column 6.

In the low-pressure chamber of fractionating column (demethanizer) 6, the liquid phase fed through pipe line 14 is caused to travel countercurrently in relation to the vapors formed from said phase thereby enriching said vapors with lower-boiling components. Vapor formation proceeds thanks to the evolution of the heat of condensation of the gaseous phase from the high-pressure chamber of fractionating column 6.

The demethanized ethane-ethylene fraction is withdrawn from the bottom of the low-pressure chamber and directed through pipe line 15 into condenser-evaporator 2.

The demethanized fraction has the following analysis:

| Component: | Content, mol percentage |
|---|---|
| $CH_4$ | 0.05 |
| $C_2H_4$ | 45 |
| $C_2H_6$ | 46.55 |
| $C_3H_8$ | 8 |
| $C_4H_{10}$ | 0.4 |
| | 100 |

The heat of condensation of the feed gas causes the evaporation of the ethane-ethylene fraction in the condenser-evaporator 2, from whence thef raction flows through pipe line 16 for further separation.

The methane fraction is withdrawn from the top of the low-pressure chamber of fractionating column (demethanizer) 6 and directed through pipe line 17 into supercooler 18, from whence it flows via pipe line 19 into supercooler 10, and leaves said supercooler via pipeline 20.

The composition of the methane fraction is as follows:

| Component: | Content, mol percentage |
|---|---|
| $H_2$ | 4 |
| $CH_4$ | 94 |
| $C_2H_4$ | 2 |
| | 100 |

In order to diminish ethylene losses with the methane fraction, the liquid fraction is directed from separator 8 via pipe line 21 into supercooler 18, from whence, upon supercooling, it is withdrawn through pipe line 22, subjected to throttling in valve 23 and fed as reflux into the top of the low-pressure chamber of column (demethanizer) 6.

In contradistinction to the flow diagram shown in FIG. 1, the flow diagram presented in FIG. 2 involves partial withdrawal from the column of vapors formed in the low-pressure chamber of the column, whereupon said vapor portion is directed via pipe line 24 into supercooler 10 or other heat exchangers (not shown in FIG. 2), which recover the refrigeration from return streams, and thereafter flows via pipe line 25 to the suction side of the feed gas compressor 27. The modified flow diagram presented hereinabove finds application where the content of methane in the feed gas is low, so that the amount of methane reflux is insignificant and there arises the problem of attaining a high degree of ethylene separation.

When the pyrolysis gases contain a significant percentage of propane and heavier hydrocarbons, fractionation of the demethanized fraction presents difficulties. To increase the efficiency of the method, the step that follows the demethanization step, viz, the step of ethylene isolation in condenser-evaporator 2, also involves countercurrent evaporation as a means of cooling the feed gas (see FIG. 2). The precooled feed gas is fed from the bottom into the tube space of condenser-evaporator 2 and undergoes partial condensation. The heat of condensation is consumed for vaporizing the demethanized ethane-ethylene fraction in the low-pressure chamber of condenser-evaporator 2.

In the low-pressure chamber of condenser-evaporator 2, provision is made for directing the ethane-ethylene fraction, delivered from fractionating column (demethanizer) 6, so that said fraction flows countercurrently with respect to ethylene-rich vapors formed on evaporation.

The vapors from condenser-evaporator 2 are fed via pipe line 16 into an ethylene column, whilst the liquid is directed via pipe line 26 for further separation (the ethylene column is not shown in the flow diagram).

We claim:

1. A method for the demethanization of a gaseous hydrocarbon mixture comprising (1) partially condensing said gaseous mixture in a condensation zone to form a first methane rich gas phase and a liquid phase; (2) separating said first methane rich gas phase from said liquid phase in a separation zone; (3) conveying said first methane rich gas phase to a high pressure zone as reboil in a demethanization zone wherein said methane rich gas phase is partially condensed; (4) reducing the pressure of and conveying said liquid phase from step (2) to a low pressure zone in the demethanization zone in heat exchange with the first methane rich gas phase to provide second methane rich vapors; (5) effecting direct countercurrent contact between the second methane rich vapors derived from the liquid body of said partial condensation step (3) and the liquid phase from step (4) in said low pressure zone whereby the heat of condensation of said first methane rich gas phase results in the demethanization of said liquid phase from step (4) to further enrich said methane rich gas phase and (6) separating from said low pressure zone said enriched methane rich gas phase.

2. The method of claim 1 wherein said hydrocarbon mixture is selected from the group consisting of petroleum gases and ethane pyrolysis gases.

3. The method of claim 1 wherein a portion of the methane rich vapors is withdrawn from said low pressure zone and conveyed to a compressor and thence recycled to said condensation zone.

4. The method of claim 1 wherein said partial condensation during step (3) is carried out at a pressure of about 60 atm.

5. The method of claim 1 wherein said gaseous mixture is partially condensed in the condensation zone employing as a cooling medium the demethanized liquid phase from step (5).

6. The method of claim 5 wherein said condensation zone contains a low pressure and a high pressure zone, said gaseous mixture passing in heat exchange relation with said demethanized liquid phase in said high pressure zone to partially condense said gaseous mixture and partially vaporize said liquid phase to form ethylene-rich vapors and contacting said vapors counter-currently with said liquid phase.

7. The method of claim 1 wherein the partially condensed phase from step (3) is separated into a gaseous phase mainly comprising hydrogen and a liquid phase mainly comprising methane, said liquid phase being conveyed as a reflux to said low pressure zone.

8. The method of claim 7 wherein said hydrogen gaseous phase and said methane liquid phase are utilized to cool said liquid phase obtained in step (2).

References Cited

UNITED STATES PATENTS

| | | | |
|---|---|---|---|
| 2,552,560 | 5/1951 | Jenny et al. | 62—13 |
| 2,692,484 | 10/1954 | Etienne | 62—28 XR |
| 2,729,954 | 1/1956 | Etienne | 62—28 |
| 2,743,590 | 5/1956 | Grumberg | 62—28 |
| 2,765,637 | 10/1956 | Etienne | 62—27 |
| 2,817,216 | 12/1957 | Etienne. | |
| 2,863,296 | 12/1958 | Newton | 62—14 |
| 3,364,685 | 1/1968 | Perret | 62—23 XR |

NORMAN YUDKOFF, *Primary Examiner.*

V. W. PRETKA, *Assistant Examiner.*

U.S. Cl. X.R.

62—26, 28, 29